United States Patent [19]

Campbell et al.

[11] 4,330,515

[45] May 18, 1982

[54] PREPARATION OF PHOSPHOROUS ACID FROM INDUSTRIAL WASTE MATERIAL CONTAINING PHOSPHITES

[75] Inventors: Donald H. Campbell, Niagara-on-the-Lake, Canada; Edward J. Quinn, East Amherst, N.Y.

[73] Assignee: Hooker Chemicals & Plastics Corp., Niagara Falls, N.Y.

[21] Appl. No.: 217,631

[22] Filed: Dec. 18, 1980

[51] Int. Cl.$^3$ .............................................. C01B 25/16
[52] U.S. Cl. ..................................... 423/316; 423/304
[58] Field of Search ............... 423/307, 316, 317, 305, 423/304

[56] References Cited

U.S. PATENT DOCUMENTS 3,374,055 3/1968 Villalon ................................ 423/320
3,645,682 2/1972 Cochran .......................... 423/321 R

FOREIGN PATENT DOCUMENTS 1218063 12/1959 France ................................ 423/317

*Primary Examiner*—Earl C. Thomas
*Assistant Examiner*—Gregory A. Heller
*Attorney, Agent, or Firm*—Thomas T. Gordon

[57] ABSTRACT

A process for the preparation of phosphorous acid from phosphites contained in industrial wastes, wherein the waste material is dissolved in an aqueous solution of phosphorous acid and reacted with a strong mineral acid that will remove the cation of the phosphite producing phosphorus acid. An alternative method for preparation is the passage of the solution of phosphite in phosphorus acid through a cation ion exchange resin to produce phosphorous acid. A typical industrial waste containing phosphites is the waste that occurs from the process of manufacturing sodium hypophosphite.

7 Claims, No Drawings

PREPARATION OF PHOSPHOROUS ACID FROM INDUSTRIAL WASTE MATERIAL CONTAINING PHOSPHITES

BACKGROUND OF THE INVENTION

The growth of the electroless plating industry, especially its application in the automotive sector has led to increased quantities of hypophosphites being consumed. This led to rapid increases in production of the hypophosphites and also to increase in the amount of by-products resulting from this expansion.

A method of manufacturing hypophosphites is through the reaction of caustic and phosphorus followed by a lime precipitation of the crude calcium phosphite by-product. The precipitate is removed from the reactor and is currently discarded by burial in a secure landfill. This precipitate is removed from the reactor in a semi-solid mass and is commonly referred to as "hypo mud".

In the manufacture of sodium hypophosphite, sodium hydroxide is used as a caustic, and reacted with phosphorus, followed by a lime treatment. Dependent upon the purity of the chemicals used, the desired product and the precipitate could contain many types of impurities. The precipitate that was previously discarded contained quantites of lime, calcium phosphite, alumina, sand, to mention but a few. From an industrial standpoint, the reclamation of such a type of waste did not encourage processing but rather discarding. With the advent of environmental rules and regulations concerning waste disposal the disposal of such mud by landfill burial is an environmental problem, that the chemical industry must solve. An approach taken was the investigation of this mud to determine if the offensive substances could be removed and if usable chemicals or by-products could be obtained. One of these approaches is the basis for this invention.

Although many of the materials contained in this "hypo mud" are essential to our environment and play an important part in the life cycle on earth, the presence of specific species and quantities thereof must be controlled. The disposal through landfill burial is although a suitable and acceptable procedure, if the material to be buried meets a fixed environmentally safe criteria. In this application, the disposal of "hypo mud", there should be removal of the phosphorus components as well as other metallic components. Although this invention does not claim to provide a completely safe and secure material for landfill burial, it is at least a step in the direction of providing a material that can be easily, efficiently and economically disposed of without danger to the environment.

It is an object of this invention to provide an environmentally secure waste product that can be easily and universally discarded.

An object of this invention is to reclaim useful chemical materials from the "hypo mud".

An object of this invention is to obtain phosphorous acid as a by-product of the "hypo mud".

SUMMARY OF THE INVENTION

A process for the preparation of phosphorous acid from the waste or by-products of chemical processes which contain amounts of phosphites. The process dissolves wholly or partially the phosphites present in an aqueous solution of phosphorous acid, removing the undissolved portion and processing the filtrate in either of the following procedures. The filtrate can be treated with a strong mineral acid which will react with the soluble cation associated with the hypophosphite anion to produce an insoluble product leaving a solution of phosphorous acid. Or the filtrate can be passed through a cation ion exchange material which will absorb the cation associated with the phosphite anion and exchange a H+ cation to form a phosphorous acid solution. The phosphorous acid solution from either approach can be concentrated if desired.

DETAILED DESCRIPTION OF THE INVENTION

The use of the words industrial waste, chemical waste, or residue used herein shall denote the waste products or residue from a chemical operation wherein another compound is the major product. For example, in the process to manufacture sodium hypophosphite (the major product) there forms within the reaction site a precipitate which is removed from the reactor, and this precipitate would be termed the chemical waste of the process. In this particular process, the waste is removed in a semi-solid form commonly known as "hypo mud" or simply "mud". These terms will be used herein with the above described meanings.

An analysis of a typical "hypo mud" removed from the sodium hypophosphite manufacture has the following composition:

| Total Water | 43.74 weight % |
| --- | --- |
| $CaHPO_3$ | 44.99 |
| $Ca(OH)_2$ | 1.79 |
| $CaCO_3$ | 0.80 |
| $Al_2O_3$ | 1.78 |
| $SiO_2$ | 3.51 |
| Fe | 0.08 |
| $SO_4=$ | 0.005 |
| Unknown | 3.31 |

"Hypo mud" of the above composition has been used as the starting material in all of the examples that will be presented later. This composition is very typical to this production operation and varies over a slight range. During the production of sodium hypophosphite filter aids may be added to the reactor to assist in the removal of the waste products, and from these filter aids come some of the impurities and variations.

This mud is mixed with an aqueous phosphorous acid solution and heated, which dissolves many of the components contained in the mud. After a period of time, the mixture can be filtered to remove the undissolved portion, mainly the silicon and aluminum. This undissolvable portion can be safely discarded.

Dependent upon the filter aids employed, and upon the purity of the materials charged to the hypophosphite reactor the precipitate or mud produced may have little undissolved materials after the addition of the phosphorous acid solution and filtration may not be necessary.

If filtration of the phosphorous acid solution occured, or if it was deemed necessary, two approaches may be taken to convert the calcium phosphite present in solution to phosphorous acid. The reactions may be shown as follows:

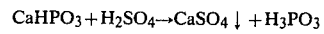

$CaHPO_3 + H_2SO_4 \rightarrow CaSO_4 \downarrow + H_3PO_3$     Process A

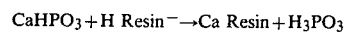

$CaHPO_3 + H\ Resin^- \rightarrow Ca\ Resin + H_3PO_3$     Process B

Process A employs a strong acid to convert the calcium phosphite to phosphorous acid while Process B uses a cationic ion-exchange resin to exchange $H^+$ ions for the $Ca^{++}$ ions to produce the phorphorous acid.

In Process A, a strong mineral acid such as sulfuric acid is now added to the solution. Sulfuric acid is preferred as it will react with the calcium ions present to produce calcium sulfate, which is insoluble in the mixture, and can be easily removed.

Other acids may be used, but it is desireous to use an acid with an anion that will react with the cation of the phosphite and become insoluble or easily removable. When calcium is the cation, sulfuric acid is recommended as the calcium sulfate produced is very insoluble and can be easily removed by filtration, and can be discarded or used. The precipitate may also contain impurities that precipitate or are insoluble in the solution.

The filtrate is essentially a dilute aqueous solution of phosphorous acid of which a portion can be returned to be used in the dissolving of the mud or may be concentrated through evaporation or other known concentration techniques to produce a commercially usable phosphorous acid.

Process B is a method of phosphorous acid recovery from the "hypo mud" wherein the mud is dissolved in phosphorous acid, as described above, and having the phosphite ions in solution, the solution is passed through an ion exchange resin of the cationic type. This passage through the cationic ion exchange material will allow the liquid eminating from the column of resin to be essentially a dilute solution of phosphorous acid, which can be concentrated in the manner hereinabove discussed to produce a commercial grade of phosphorous acid. As mentioned above, this diluted phosphorous acid can also be returned to the dissolving step for further use.

The ion-exchange resin used in this process is of a strong cationic type wherein the cation of the phosphite anion, e.g. $Ca^{++}$, is exchanged for $H^+$ ions. Typical ion-exchange resins that meet these requirements are Amberlite 200, and Amberlite 120, both of which are manufactured and sold by Rohm & Haas, Philadelphia, Pa.

Through the incorporation of sound chemical engineering principles the above technique can be used either in a batch type operation or can be used in a continuous manner. The selection of operational type will be dependent upon the factors of size of hypophosphite manufacture, quantities of mud produced, need for phosphorous acid, economics and many other factors.

The continuous operation will be further illustrated by Examples I and II. The ion exchange method will be illustrated in Example III.

EXAMPLE I

A sample of the mud was analyzed for calcium phosphite content. A quantity of mud containing 1200 gms of calcium phosphite was dispersed in 3000 gms of 30 wt% phosphorous acid to make the feed solution.

A continuous stirred tank reactor (2 liter) equipped with a variable speed agitator and heating mantle was used to convert the calcium phosphite to phosphorous acid. The above feed solution was fed to the reactor at 27.5 ml/min. Sulfuric acid containing 97 wt% $H_2SO_4$ was fed to the reactor at a rate of 2.4 ml/min. The temperature of the reactor was maintained at 70° to 75° C. throughout the run. The product stream was withdrawn from the reactor at a continuous rate of 33 ml/min with a residence time of 30 minutes.

The analysis of the product stream indicates that it contains 26 wt% phosphorous acid which corresponds to a conversion of 99.2% based upon the calcium phosphite fed to the reactor. The calcium sulfate in the product stream was in the dihydrate form of $CaSO_4.2H_2O$.

EXAMPLE II

A sample of mud was analyzed for calcium phosphite content, and a solution was prepared by dissolving mud equivalent to 1080 grams of calcium phosphite in 3000 grams of 30 wt% phosphorous acid. An additional 720 gms of water was added to the solution to constitute the feed solution. This feed solution was fed to a 2 liter continuously stirred tank reactor, equipped with a heating mantle at a rate of 28 ml/min. Sulfuric acid solution containing 60 wt% $H_2SO_4$ was fed to the reactor at a rate of 6.0 ml/min. The reactor temperature was maintained at 66° to 70° C. throughout the run. The product stream was withdrawn at a rate of 33 ml/min.

The analysis of the product stream shows that the stream contains 28.6 wt% phosphorous acid or a yield of 95.4%. The calcium sulfate in the product stream was identified by x-ray diffraction to be $CaSO_4.2H_2O$.

EXAMPLE III

An analyzed sample of "hypo mud" was mixed with a 30 wt% phosphorous acid to obtain a 0.58 molar $CaHPO_3$ concentration. This solution was passed through a fixed bed ion exchange column containing a cation exchange resin. A column $\frac{3}{4}$ inch in diameter and 12 inches long was employed containing Amberlite 120 (a cation exchange resin supplied by Rohm & Haas, Philadephia, Pa). The resin occupied 86.8 $cm^3$. The solution of $CaHPO_3$ was fed to the column at a rate of 0.43 $gal/min/ft^2$ until a breakthrough of calcium was observed in the effluent. The operating capacity of the resin bed was found to be 5.0 lbs $CaHPO_3$/cubic foot of resin.

While we have shown and described particular embodiments of our envention, modifications and variations thereof will occur to those skilled in the art. We wish it to be understood, therefore, that the appended claims are intended to cover such modifications and variations which are within the true scope and spirit of our invention.

We claim:

1. A process for the preparation of phosphorous acid from phosphite industrial wastes comprising: dispersing the waste materials in an aqueous solution of phosphorous acid, removing the undissolvable portion, adding a strong mineral acid to react with the cations present to cause precipitation, and collecting the phosphorous acid produced.

2. The process of claim 1 wherein the waste material is predominately calcium phosphite and the strong mineral acid is sulfuric acid.

3. The process of claim 1 wherein the undissolved and precipitated materials are removed by filtration.

4. A process for the preparation of phosphorous acid from calcium phosphite contained in an industrial waste comprising: dispersing the waste materials in an aqueous solution of phosphorous acid, removing any undissolvable portion, adding sulfuric acid to cause calcium sulfate precipitation, and collecting the phosphorous acid.

5. The process of claim 4, wherein the temperatures of the dissolving and reaction steps are maintained within a range of about 60° to about 80° C.

6. The process of claim 5 wherein the temperature is maintained within the range of about 65° to about 75° C.

7. A process for the removal of phosphorous acid from phosphite industrial waste comprising: dispersing the waste materials in an aqueous solution of phosphorous acid, removing the undissolvable portion, passing the solution through a cationic ion-exchange resin, and collecting the phosphorous acid that emits therefrom.

* * * * *